Fig.5.

Oct. 24, 1933.　　　A. KOTTMANN　　　1,932,220
CALCULATING MACHINE
Filed Oct. 15, 1931　　　7 Sheets-Sheet 5

INVENTOR:
August Kottmann
BY
Lotka & Kohlenbeck
ATTORNEYS.

Oct. 24, 1933.  A. KOTTMANN  1,932,220
CALCULATING MACHINE
Filed Oct. 15, 1931   7 Sheets-Sheet 6

Patented Oct. 24, 1933

1,932,220

UNITED STATES PATENT OFFICE 1,932,220

CALCULATING MACHINE

August Kottmann, Sommerda, Thuringia, Germany, assignor to the firm Rheinische Metallwaaren- und Maschinenfabrik Sömmerda Aktiengesellschaft, Sommerda, Germany, a corporation of Germany Application October 15, 1931, Serial No. 568,972, and in Germany January 30, 1929

3 Claims. (Cl. 235—60)

My invention relates to calculating machines having three key boards and in which one of these key boards belongs to the writing mechanism and serves to adjust the type carriers or to move the type levers, the second key board serves to set the calculating drives, and the third key board is provided for setting the multiplication rulers. According to my invention, the number key board serving to adjust or move the writing mechanism may selectively be coupled with one or with both other key boards in such a manner that, as soon as a key of this key board setting a certain number value is depressed, the key of the other key boards belonging or corresponding to this number value is also set. Therefore, if the key boards are coupled, the depression of a key of the key board corresponding to the writing mechanism effects the simultaneous setting of the writing mechanism, of the calculating drives and of the multiplication rulers or of any one of these other mechanisms.

In known calculating and writing machines provided with three key boards, number values which are to be written or printed and simultaneously to be set in the calculating drives, or in the multiplication rulers, or in both of them, are successively set in each of the key boards. Therefore, in such machines it is not impossible, that by mistake other numbers than those set in the writing mechanism will be set in the calculating drives or in the multiplication rulers; that is to say, a wrong number may be set in the drives of the counting mechanism or in the multiplication rulers, notwithstanding the fact that the correct number appears upon the paper fixed in the writing machine. The number appearing upon this paper is, therefore, no assurance that the very same number is set in the calculating drives or in the multiplication rulers.

This disadvantage is obviated by the device according to the present invention, as in my improved machine, after the key boards have been coupled, a number set in the writing mechanism is simultaneously set in the other key boards also, so that under all circumstances the number written upon the paper, is also set in the drives of the counting mechanism or in the multiplication rulers or in both of them. At the same time the advantage is obtained that work is saved, because a single setting of the number is sufficient to introduce it into all the three key boards.

If the device according to the invention is used in combination with a writing machine provided with a movable paper platen carriage controlled by a tabulator, which machine serves for the often repeated writing of one and the same scheme of calculation or bill in which, therefore, the adjustment of the paper platen carriage always corresponds to the same calculating and setting operation, the control of the devices for coupling the key boards may be effected automatically by the paper platen carriage associated with the control key board. For this purpose cam elements are provided at the paper platen carriage which cooperate with or act upon counter cam elements carried by the coupling members.

In case several counting mechanisms are provided in such calculating machines, additional cam elements of the same kind may be arranged at the paper platen carriage by means of which well known devices may be controlled to engage the counting mechanisms with or disengage them from the calculating drives, and adjust the counting mechanisms for carrying out additions or subtractions.

The present application is a continuation in part of my application Serial No. 420,039, filed in the United States Patent Office on January 11, 1930.

In the accompanying drawings one mode of carrying the invention into effect is shown by way of example, the key boards in this preferred embodiment of the invention being coupled electrically.

The calculating machine contains in the part I the writing or printing mechanism constructed as a typewriter, in the part II of the machine the calculating drives are provided, whereas the part III of the machine contains the multiplication rulers. The type levers of the writing mechanism, adapted to write the numbers 0–9, are moved by the keys of the control key board 1. The setting of the calculating drives is effected by the key board 3, acting upon the setting pins 2a of the carriage 2 carrying these pins. The setting of the multiplication rulers is effected by the key board 5. In the example illustrated, the calculating drives as well as the multiplication rulers are assumed to be constructed as racks the working movement of which is, in accordance with the number value set by the keys, limited by the setting pins 2a.

The electrical coupling of the key boards 3 and 5 with the key board 1 is effected by electromagnets 6 (Fig. 3) arranged below the keys of the key board 3 and by electromagnets 7 arranged below the keys of the key board 5. These electromagnets are energized and pull down the corresponding key, as soon as the key of the key board 1 corresponding to the same number value is depressed and thereby the contact device 8, lying below said key, is closed. A circuit across the electromagnets 6 and 7 respectively may, however, only be closed by these contact devices 8, if simultaneously the contact devices 9, 10 and 9, 11 respectively (Figs. 1 and 3) are closed which are controlled by the paper platen 12 of the typewriter, as will immediately be more fully described.

Figures 1, 2:
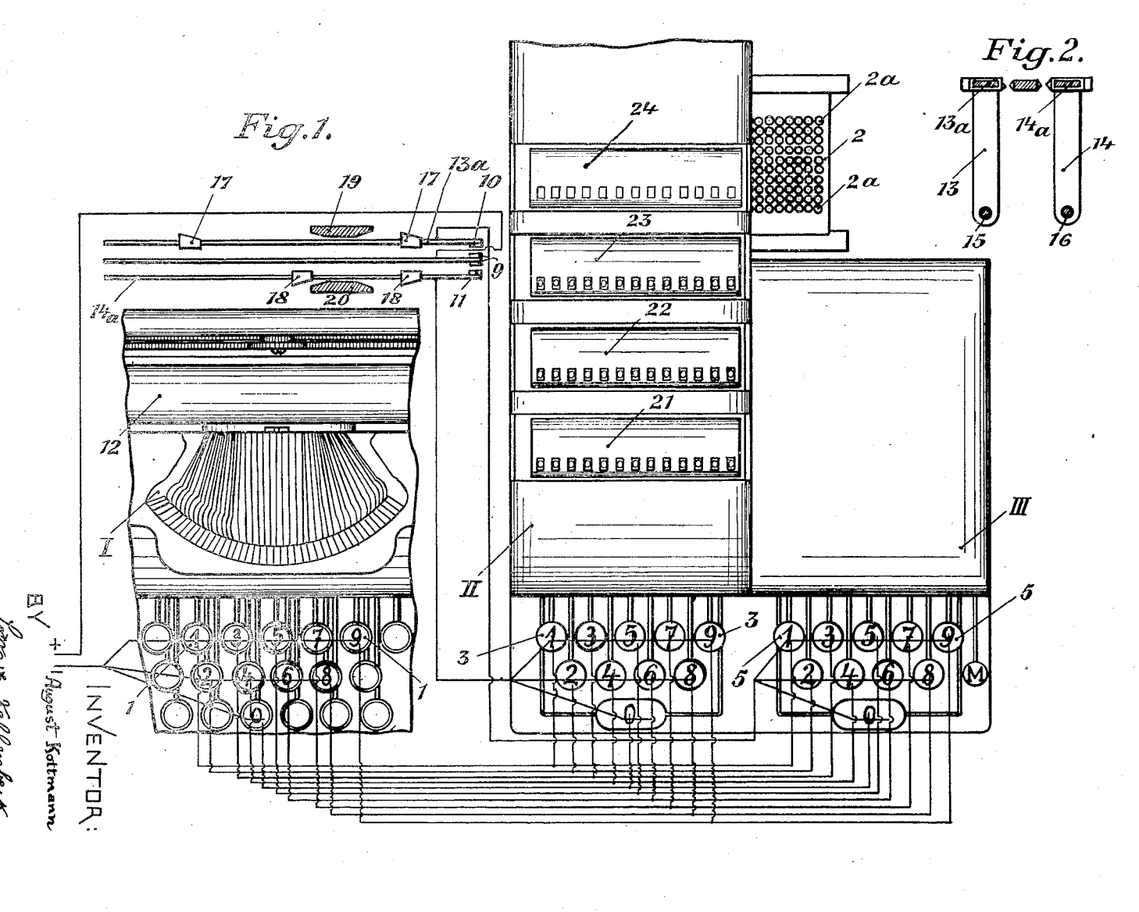
Figure 1 is a general view of a machine according to the invention, showing particularly the key boards and diagrammatically the electrical connections.
Figure 2 is a side view of a detail.

The common middle portion 9 of the contact devices 9, 10 and 9, 11 respectively is fixed to the frame of the machine and the contact halves 10 and 11 are carried by two yokes 13 and 14 (Fig. 2). These yokes are swingably arranged upon axes 15 and 16, respectively, and carry a number of control members 17 and 18, respectively, which are adjustable lengthwise of the parallel yoke portions 13a and 14a respectively and are provided with inclined surfaces. Control members 19 and 20, moved by the paper platen carriage 12, cooperate with the control members 17 and 18 respectively. When the control member 19 engages one of the control members 17, the contact device 9, 10 is closed. Under these conditions circuits may be closed across the magnets 7 of the key board 5. When the control member 20 engages one of the control members 18, the contact device 9, 11 is closed, so that the magnets 6 of the key board 3 may be energized. If neither of the contact devices 9, 10 or 9, 11 is closed, neither the magnets 6 nor the magnets 7 may be energized. The key boards 1, 3 and 5 are then absolutely independent of each other.

The adjustment of the setting pins 2a is accomplished by the keys of the key board 3 whose key levers 50 (Fig. 6) raise the setting pins by means of the projections 51. The advance of the setting pins carriage 2 into the next decimal position is effected by the springs 57 (Fig. 5) together with the keepers 55 which engage in the rack 56 of the carriage 2, and which are actuated by an angular lever 52 (Fig. 5) pivoted at 53 (Fig. 6), the laterally bent end 54 of such lever extending over the whole width of the key board 3, and being moved downwardly by the key levers 50 upon depression of the keys.

The motor 58 (Fig. 5) operating through a drive 59, follower 60, coupling dog 61 and coupling disk 62 drives a shaft 63 and through the latter drives the main drive shaft 65 through the bevel gears 64, 66. A gear 67 is positioned upon the main drive shaft 65 and engages the gear 68 connected with the crank disk 69. The latter displaces a slide 71 (Fig. 6) by means of a connecting rod 70, the slide 71 being reciprocated back and forth in a horizontal plane; the slide 71 which, in the initial position of the shaft 65 is located at the extreme right as viewed in Fig. 6, is moved toward the left during the first half revolution of the shaft and is returned to the initial position during the second half of such revolution.

Over the slide 71 are arranged racks 73 equal in number to the number wheels of the computing mechanisms. The racks 73 are drawn toward the left (Fig. 6) by springs 74, and bear against the slide 71 by downwardly directed projections 73a. By such arrangement the racks follow every movement of the slide 71 when they are not held against such movement in some other way.

As soon as a setting pin 2a is shifted upwardly in the carriage 2, it projects into the path of movement of the left end 73b of the overlying rack 73, and thus, when the slide begins to reciprocate, limits the shifting of the rack 73 to a distance corresponding to the number value associated with such setting pin.

The computing or counting mechanisms 21, 22 23 and 24 (Figs. 1, 5, 6, 15, see also Fig. 13) are arranged above the racks 73 and can be raised and lowered for a short distance and thus brought into or out of engagement with such racks. If the computing mechanisms are to add the introduced number value, they are brought into engagement with the racks 73 during the advance of the latter, while for subtraction, the computing mechanisms are brought into engagement with such racks during the return of the latter. While four counting mechanisms 21, 22, 23, 24 have been illustrated in Figs. 1 and 15, the number of such mechanisms may be varied; for instance the counting mechanism 24 and the parts cooperating therewith might be omitted, so that part II of the machine would have only the three counting mechanisms 21, 22, and 23 indicated in Figs. 5 and 6.

Normally, the counting mechanisms 21, 22, 23 and 24 are raised by springs not shown, so that they become disengaged from the racks 73. Laterally to the casings of the counting mechanisms are secured lugs or extensions 21a to 24a (Figure 13) made of magnetic material and below which electro-magnets 21b to 24b are arranged. Upon excitation of these magnets the counting mechanisms are pulled in a downward direction until they mesh with the respective racks 73. The said magnets are situated in the circuit of the source of current 150 and are controlled by means of the contacting devices 151 and 152, which are subjected to the action of the cam 69a of the crank disc 69, which latter through the rod 70 will impart a reciprocatory movement to the slide 71 of the rack drive of the counting mechanisms.

The electro-magnets 21b to 24b may be connected by means of switches 21c to 24c to the branch line in which the contacting device 151 is situated, and through additional switches 21d to 24d to the branch line in which the contacting device 152 is provided. The electro-magnets connected by closed switches 21c, 22c, 23c, or 24c to the circuit containing the contacting device 151 will be excited so long as the contacting device 151 remains closed. As the crank disc 69 is being rotated in the direction of the arrow in Fig. 15, such disc being shown in its initial position in Figs. 13 and 15, the contacting device 151 will be closed by the cam 69a during the first half of the rotation of the said crank disc 69. During the first half of the rotation, that is to say during the moving away of the racks, the electro-magnets 21b to 24b of the counting mechanisms, in which the switches 21c to 24c are closed, will become excited and in consequence the counting mechanisms are pulled downwards until they are in mesh with the racks 73. The amount obtained by the adjustment of the setting pins 2a is introduced into said counting mechanisms by way of addition.

Figure 15:
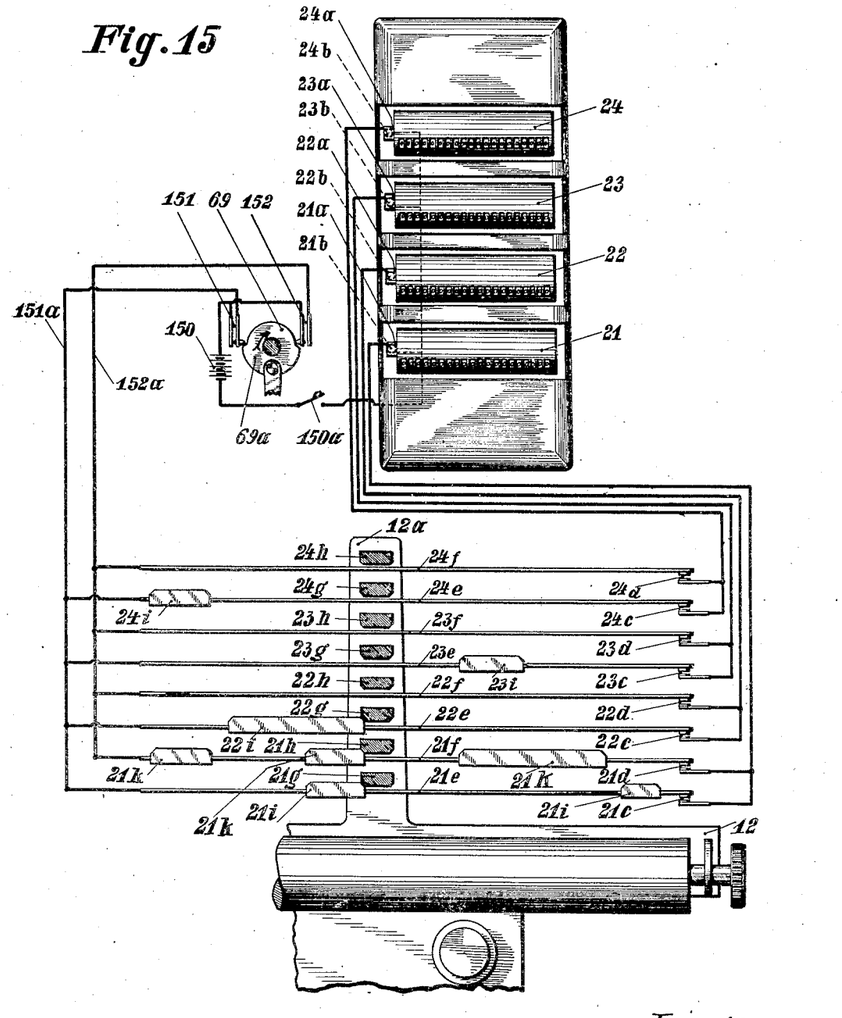

If by closing the switches 21d to 24d the electromagnets 21b to 24b are connected to the branch line containing the contacting device 152, they will be excited throughout the second half of the rotation of the crank disc 69 and the amounts contained in the setting pins are transmitted to the pertinent counting mechanisms by way of subtraction.

By suitable adjustment of the switches 21c to 24c and 21d to 24d respectively these counting mechanisms may thus be connected or disconnected, or all of them may be used for additive or subtractive calculation, and it is also possible to transfer the amounts contained in the said setting pins in an additive way to some of the counting mechanisms and in a subtractive way to other counting mechanisms.

The switches 21c to 24c and 21d to 24d are arranged close to the paper platen carriage 12, being controlled by means of curved members provided on said carriage, in a manner similar to the contact device 9, 10, 11.

Figure 13:
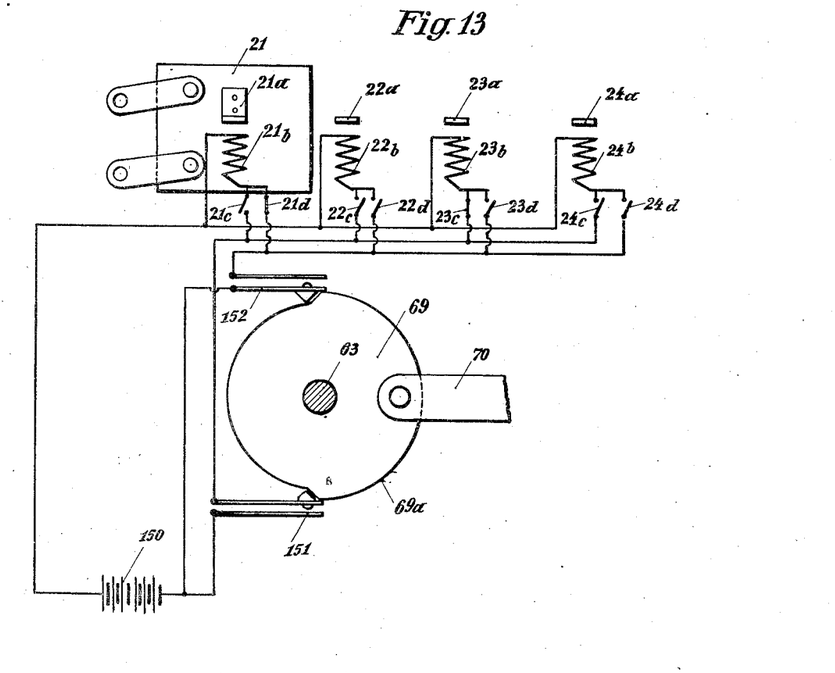

In Fig. 13, the switches 21c to 24c and 21d to 24d are indicated only diagrammatically. Fig. 15 illustrates, as an example, how these switches may be arranged and operated. Each of the switches consists of two members or halves, one of which is practically stationary, being secured to the frame of the machine, preferably by an elastic arm, as indicated at the right hand portion of Fig. 15. The other member or half of each switch is movable into and out of engagement with the first-mentioned switch member or half. Fig. 15 illustrates the switches in the open position, with the two members or halves of each switch out of contact with each other. The movable members of the switches 21c to 24c and 21d to 24d are carried by yokes 21e to 24e and 21f to 24f respectively, which yokes may be swinging yokes of the same character as the yokes 13, 14. Control members 21i to 24i and 21k to 24k are mounted on the yokes 21e to 24e and 21f to 24f respectively, said control members being normally stationary relatively to the yokes carrying them, but adjustable lengthwise thereof in a manner similar to the adjustable margin stops of typewriters. These control members 21i to 24i and 21k to 24k are adapted for co-operation with control members 21g to 24g and 21h to 24h respectively carried by an arm 12a rigid with the paper platen carriage 12. Whenever, during the movement of said carriage, one of the control members carried by the arm 12a engages the corresponding control member of the series 21i to 24i or 21k to 24k, the respective switch of the series 21c to 24c or 21d to 24d will be closed by the movement imparted to the yoke carrying the movable member of such switch. For the sake of greater clearness, Fig. 15 shows the crank disc 69 and the contact devices 151 and 152 as if they were outside the machine; in reality, these parts are located within the casing of the machine, as illustrated in Fig. 6.

Figures 3, 4:
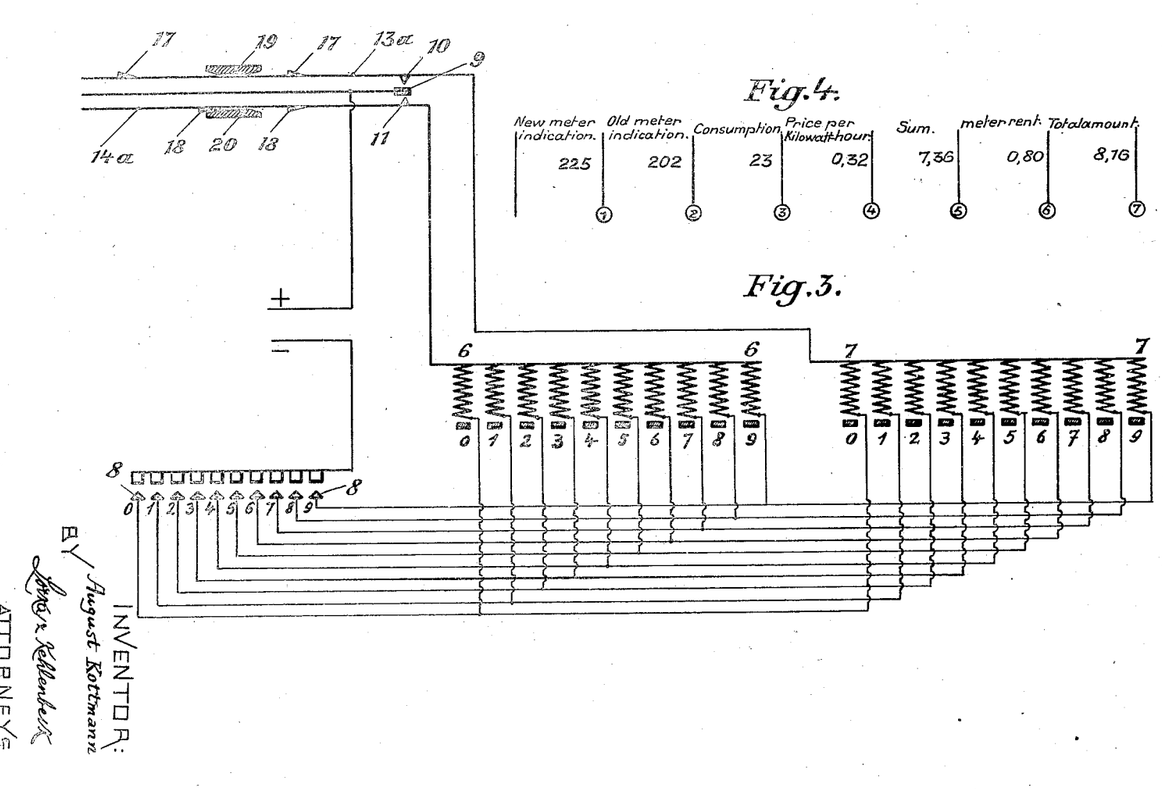
Figure 3 is a diagram of the connections.
Figure 4 is a diagrammatic view of a scheme of a bill according to which calculations are to be performed in the machine.

Fig. 15 illustrates the setting of the machine for operation under the following conditions, with reference to the column arrangement shown in Fig. 4: When the machine writes in column 1 (first column at the left), the counting mechanism 21 will operate to perform addition; when column 2 is being written upon, the counting mechanism 21 will operate subtractively; during the writing in column 3, the counting mechanism 21 will operate subtractively, and the counting mechanism 23 additively; during the writing in column 4, the counting mechanism 21 will operate additively; during the writing in column 5, the counting mechanism 21 will operate subtractively, and the counting mechanism 22 additively; during the writing in column 6, the counting mechanism 22 will operate additively; and during the writing in column 7, the counting mechanism 21 will operate subtractively, and the counting mechanism 24 additively.

In the case of addition or subtraction, the throwing-in of the drive takes place in the usual manner by means of a motor key, while the disengagement of the drive occurs in the usual manner toward the end of a revolution by means of a cam on the drive shaft. This structure is not illustrated on the drawings as it is well known in the art and forms no part of the present invention and is not necessary for an understanding thereof.

The mechanism for engaging and disengaging the drive in the case of multiplication will be described in connection with the multiplier device.

Figures 7, 7A:
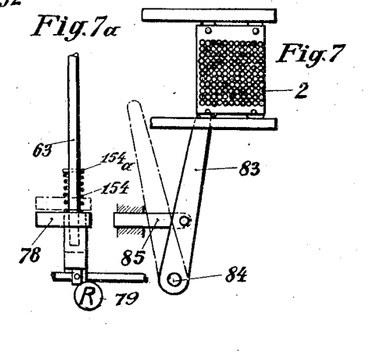
Fig. 7 illustrates the return and zero setting devices of the setting key carriage.
Fig. 7a shows a detail.
Figure 8:
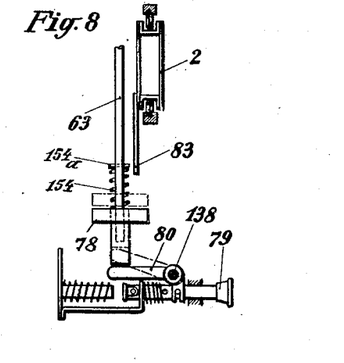
Fig. 8 is a side view of the mechanism shown in Fig. 7.

A cam 78 (Figs. 7a and 8) positioned on the shaft 63, which cam, by means of a guide link 85, moves a lever 83 swinging about the pivot 84 and articulated to the carriage 2, brings the carriage 2 back to its initial position in the case of addition or subtraction at the end of each revolution of the shaft 63, and at the same time effects the clearing or release of the pins 2a which have been shifted. The clearing of the pins is accomplished by means of a stationary member having an inclined surface 153 (Fig. 14) arranged above the carriage and under which such carriage travels when it is brought back to its initial position, such inclined surface operating to force the pins downwardly. In the case of multiplication the return and clearing devices of the carriage are thrown out of operation by the shifting of the cam 78 longitudinally upon the shaft 63 by the repeating key 79 and the angular lever 80 fulcrumed at 138.

Figure 14:
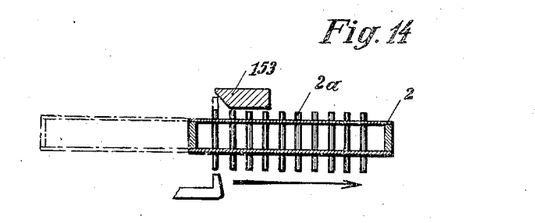

A spring 154 will return the cam disc 78 as soon as the repeating key R is again released. The said spring abuts against a pin 154a provided on the shaft 63.

The coupling 90 (Fig. 5) on the shaft 63 is normally held in engagement by spring 91, but in the case of multiplication it is thrown out of operation by the pull of an electromagnet 92 during the travel of the carriage. The manner of exciting the magnet 92 will now be described in connection with the multiplier device.

Figure 5:
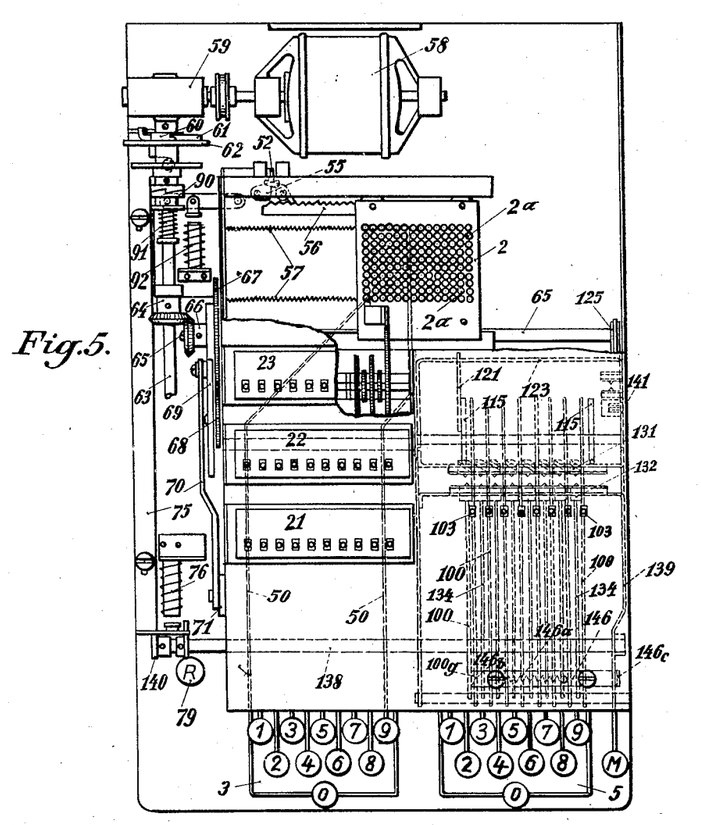
Fig. 5 is a plan view of the calculating machine.
Figure 6:
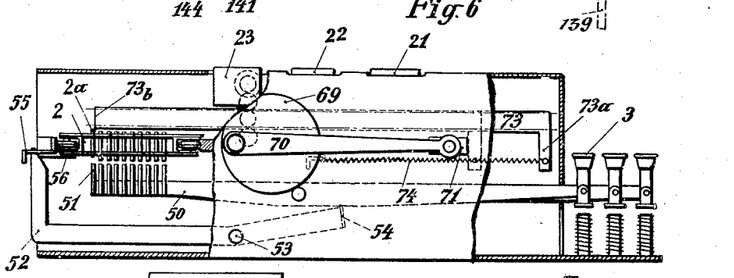
Fig. 6 is a partial side view of the calculating drives.
Figures 10, 11:
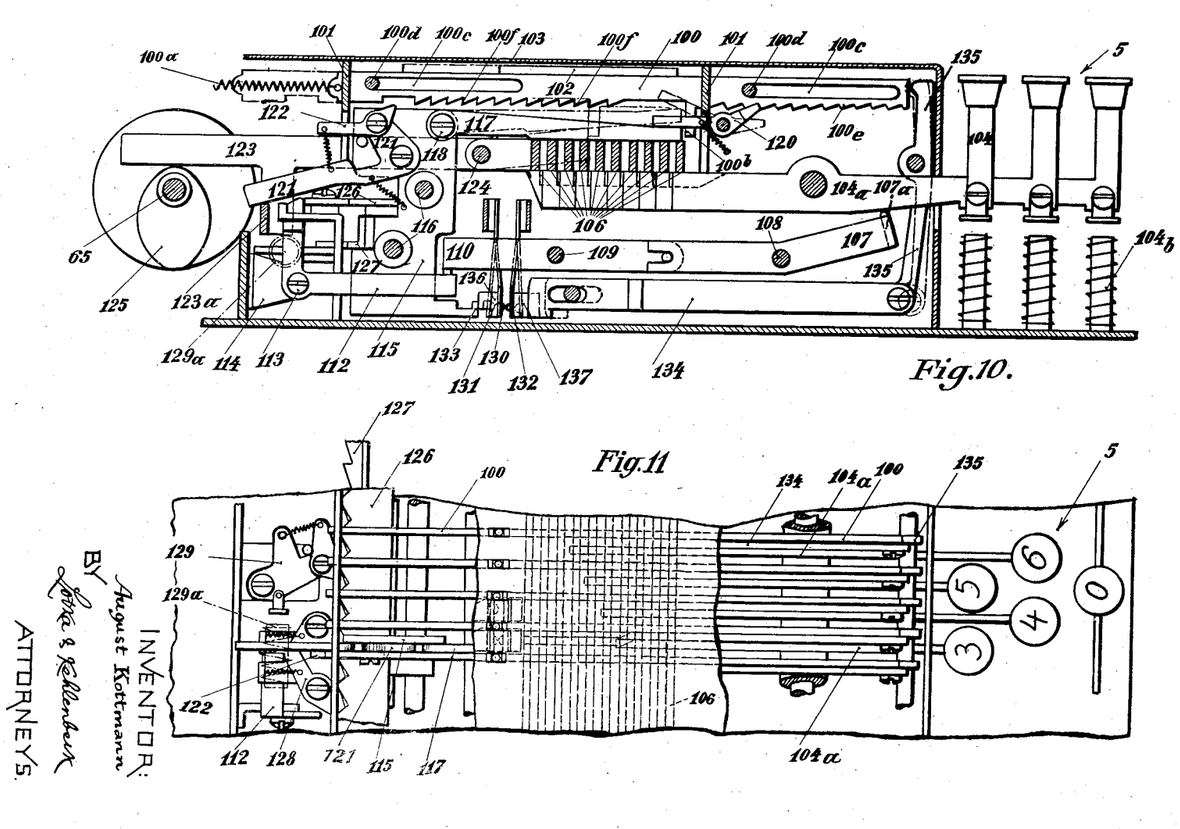
Fig. 10 is a side view of the multiplier mechanism.
Fig. 11 is a partial plan view of such mechanism.

During multiplication the machine is controlled by racks 100, which are designated as "multiplication rulers" (Figs. 5, 10 and 11). These multiplication rulers are shifted from their zero position by the operator before the beginning of a calculation, corresponding to the number values of the individual denominations of the multiplier. During the operation of the calculating machine the drive then moves the multiplication rulers, one after the other, beginning from the right, toward the initial position by a distance corresponding to the value "one" at every revolution of the main drive shaft. Every time that one of the multiplication rulers reaches the zero position, the drive is automatically thrown out, the carriage 2 is shifted by one denomination and the drive then again thrown in. These operations are accomplished in the following manner:

As can be seen from Fig. 5, the embodiment of the invention illustrated is provided with eight such multiplication rulers. The rulers are longitudinally shiftable upon transverse bars 100d (Fig. 10) supported on the machine frame and passing through slots 100c in the rulers; the rulers are guided in the vertical walls 101 and are drawn toward the left by springs 100a. Dogs 120 associated with the racks and engaging with the teeth 100e and operative to lock the racks against movement in one direction normally hold the racks fixed in the position to which they have been shifted. In addition, the rulers 100 are provided with a second row of teeth 100f, whose functions will be explained hereinbelow.

The teeth 100e and 100f have the same pitch. The rulers carry control numbers upon the parts 102, which numbers are visible through the sight holes 103 and thus permit the adjusted number value to be ascertained.

The adjustment of the multiplier rulers occurs in the following manner: By pressure upon one of the keys 104 (Fig. 10) of the keyboard 5, one of the ten bails 106 pivoted about the axis 124 is lifted by the associated key lever 104a, the bridges or cross-bars of such bails lying transversely below the multiplier rulers. The distance between the bail cross-bars measured in the direction of shifting of the rulers is equal to one of the tooth divisions of the racks 100e and 100f. This tooth division is equal to the distance corresponding to the number value "one". The key with the number value 0 raises the foremost bail, the key with number value 1 raises the second bail, etc.

As soon as the dog 120 of one of the multiplication rulers is raised, the ruler of the appropriate denomination is shifted in the manner described below until its downwardly directed projection 100b is, by the spring 100a pulled against the raised bail which thus acts as a stop to determine the shifted or adjusted position of such ruler 100. The dog 120 is then again thrown into engagement, so that the ruler is adjusted corresponding to the number value of the depressed key and held in such adjusted position.

The lifting of the dog 120 and the selection of the momentarily to-be-adjusted ruler is accomplished by means of the lever 117 lying upon the bails 106 and mounted upon the carriage 115. By shifting of such carriage, which is guided upon fixed bars 116 in the machine frame and whose movement is regulated during the ruler adjustment by a spring (not shown) pulling toward the right and by an armature switch mechanism or escapement mechanism 128 (Fig. 11), the lever 117 is first shifted under the dog 120 of the highest denomination ruler of the multiplier device. Upon rise of one of the bails 106, the lever 117 is lifted and releases said dog, whereby the associated ruler moves to the left (Fig. 10) until its projection 100b strikes the raised bail; after this ruler is thus adjusted, the carriage is shifted by the switch mechanism and the spring to the next ruler, and so on.

The switch mechanism 128 is released at every depression of a key 104. When one of the levers 104a is depressed, it presses downwardly the arm 107a of the bail 107 pivoted about the axis 108 lying transversely under the key levers, and such bail, by means of the lever 110 pivoted upon the axis 109, moves the angular lever 112 which swings about the pivot 113 and actuates the switch mechanism 128. The armatures 128 engage in the rack 126 of the carriage 115.

After adjustment of the rulers, the multiplier key designated with the letter M upon its key button is depressed. The key lever 139 of this key is fixed to the shaft 138 (Fig. 5) so that upon depression of the key, the shaft is oscillated together with the downwardly directed levers 140 and 80 (see also Fig. 8) positioned thereon. In this way, the coupling rail 75 is moved upwardly (Fig. 5) and the coupling or clutch 90 thrown in; simultaneously, the return and zero positioning devices of the carriage 115 are thrown out by the lever 80 (see dotted line position in Fig. 8), which lever can also be moved by the repeating key 79, so that the multiplicand set up in the setting pins can be successively transferred a plurality of times into the computing mechanism without being cancelled.

Figure 9:
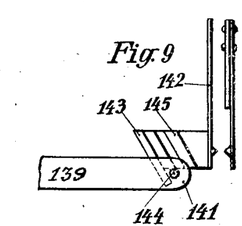
Fig. 9 shows a contact device.

The end 141 of the lever 139 of the multiplier key M carries a laterally projecting pin 144 (Figs. 5 and 9). This pin momentarily closes, upon depression of the multiplier key M, a contact device 142 which closes the circuit over an electromagnet 129a of the return mechanism 129 (Fig. 11). The latter engages in the rack 127 of the carriage 115 and moves the latter one step to the left. The carriage 115, which upon adjustment of the lowest denomination of the multiplier had moved under the next lower ruler, which was not to be adjusted, now again stands under the ruler which is adjusted corresponding to the number value of the lowest multiplier denomination.

As the main drive was thrown in by the operated multiplier key, the main drive shaft 65 is now rotating and with it rotates the cam 125 (Fig. 10) which sets into oscillation the bail 123 which is movable about the axis 124 and is otherwise non-shiftably journalled in the machine frame.

Upon the cross-arm 123a, of the bail 123, which arm extends transversely to the rulers over the whole width of the housing of the multiplier device, lies an arm of the lever 121 which is pivoted upon the carriage 115, the second arm of the lever 121 carrying the dog 122. So long as the shaft 65 rotates and therewith the cam 125, the bail 123, the angular lever 121 and the dog 122 make a complete oscillation back and forth during every revolution of such shaft.

At every position which can be imparted to the carriage 115 by the switch mechanism 128 or by the return mechanism 129, the dog 122 lies directly under one of the rulers 100. The dog 122 therefore engages the corresponding rack 100f and at every revolution of the shaft 65 shifts the ruler through a distance corresponding to the value "one", that is, by one division of the rack 100f, back toward the zero position, if the ruler lying above the same at this instant has been moved out of the zero position. At the instant that the rulers 100 reach the zero position, their ends (in Fig. 10 the right ends) strike against angular levers 135 mounted on the machine frame, such levers being arranged to actuate contact devices 130 by means of the rods 134. One such contact device and one such lever device are present for each ruler. Each contact device consists of two leaf spring contacts 131, 132, provided with abutments 136 and 137.

The rods 134 actuated by the rulers through the angular levers 135 move only the contacts 132. The circuits are closed through the contact devices only when the carriage 115 holds the second contact 131 in the proper position with its nose 133. A circuit which has been closed by a ruler is thus again broken as soon as the carriage 115 is shifted by the return mechanism 129 under the next higher ruler and the contact spring 131 again released.

The contact devices 130 make three circuits as soon as they are closed, one over the electromagnet 92 which throws out the coupling 90, a second over the electromagnet 129a, which actuates the return mechanism 129 of the carriage 115, and a third over the magnet 104b (Fig. 10) which depresses the zero key of the key board 3, whereby in the next lower position of the setting pin carriage the pin corresponding to 0 is raised and, as the pawl mechanism 55 of the carriage 2 is out of operation, the carriage 2 moves to the left through one denomination.

The coupling 90 is thus thrown out and both carriages travel one step to the left. By the shifting of the carriage 115 the circuit across the contact device 130 is again broken, so that the coupling 90 is again thrown in by the spring 91 and the machine starts again to run.

When the carriage 115 is brought into the next higher denomination position, the next higher ruler is withdrawn toward zero position by the dog 122 at every revolution of the drive shaft by a distance corresponding to the numeral "one", and the nose 133 of the carriage 115 moves the contact 131 of the next higher contact device 130 into prepared position. The calculating drives now transfer the multiplicand set up in the setting pin carriage to the next higher number wheels of the computing mechanism.

After the drive shaft has made as many revolutions as corresponds to the adjustment of the then operative multiplication ruler, the contact device 130 is closed. The coupling 90 is again thrown out, the carriage 2 and the carriage 115 are again moved into the next higher position etc. until all of the rulers have been brought to their zero position.

Figure 12:
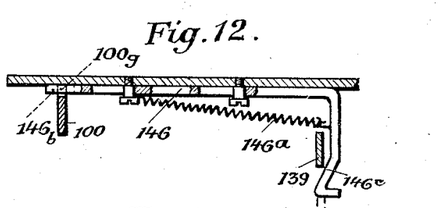
Figs. 12 to 15 illustrate details.

The highest denomination ruler has an upward projection 100g (Figs. 5 and 12) which at the last step of the ruler, before the latter reaches the zero position, strikes against an inclined surface 146b of the shifter 146. This shifter is positioned on the cover of the housing of the multiplier device and is pulled toward the left by a spring 146a. The shifter is pressed toward the right, upon depression of the multiplier key M, by the downwardly moving key lever 139 which then engages its inclined surface 146c (Fig. 12), and the shifter then positions itself over the key lever, so that the key remains in its lower position (shown in dotted lines). The key is released only when the highest ruler has reached the zero position and has moved the shifter 146 toward the right by means of the projection 100g, after which the machine is at rest. Upon the return of the multiplier key, the return and zero devices of the setting pin carriage are again thrown in, so that toward the end of the last revolution, the carriage returns to its initial position and the setting pins are released.

In order to demonstrate the purpose and advantages of the coupling device according to the invention, the use and operation of same in carrying out a greater number of calculations according to the scheme illustrated in Fig. 4 will now be described in connection with the calculating machine shown by way of example in the accompanying drawings.

Before the calculation starts, the machine is prepared in the following manner:

The control members 17, 18 and 19, 20 by means of which the coupling devices between the key boards 3 and 5 and the key board 1 are actuated, are so adjusted, that, if the platen occupies the positions in which the writing is effected in the 1st, 2nd, 3rd, 5th, 6th and 7th column of the paper carried by the platen, the key board 3 is coupled with the key board 1, whereas in the position of the platen in which the 4th column of the paper is opposite the point of writing, the key board 5 is connected to the key board 1.

The control members switches 21c to 24c and 21d to 24d, Figs. 13 and 15, by means of which the paper platen carriage controls the devices for engaging the counting mechanisms with the calculating drives are so adjusted, that in column 1 the counting mechanism 21 is set for performing additions, in column 2 the counting mechanism 21 is set for performing subtractions, in column 3 the counting mechanism 21 is set for performing subtractions and the counting mechanism 23 is set for performing additions, in column 4 the counting mechanism 21 is set for performing additions, in column 5 the counting mechanism 21 is set for performing subtractions and the counting mechanism 22 is set for performing additions, in column 6 the counting mechanism 22 is set for performing additions and in column 7 the counting mechanism 22 is set for performing subtractions and the counting mechanism 24 is set for performing additions.

The relationship between the seven columns on the bill to be computed, the key boards operatively connected with the key board 1 and the adjustment of the counting or computing mechanisms 21, 22, 23 and 24 may be represented as follows, the signs (+) and (−) indicating that the counting mechanism is adjusted for addition or subtraction:

| Column | 1 | 2 | 3 | 4 | 5 | 6 | 7 |
|---|---|---|---|---|---|---|---|
| Keyboard | 3 | 3 | 3 | 5 | 3 | 3 | 3 |
| Computing Mechanism | 21(+) | 21(−) | 21(−) 23(+) | 21(+) | 21(−) 22(+) | 22(+) | 22(−) 24(+) |

After the machine is prepared in this manner for performing the calculations according to the scheme of bills shown in Figs. 4, the paper platen carriage is pushed to the right as far as possible so that writing may be effected in column 1. Hereby the key board 3 is coupled with the key board 1 and the counting mechanism 21 is set for performing additions. Then the number value 225 is set up in the key board 1, whereby this value is written in column 1 and simultaneously introduced, by means of the key board 3 coupled with the key board 1, into the calculating drives. The coupling key, starting the drive of the calculating machine, is then depressed, so that the number 225 is additively introduced into the counting mechanism 21. By actuating the tabulator, the paper platen carriage is then moved into the next column, that is into column 2. In column 2 the key board 3 is again coupled with the key board 1 and the counting mechanism 21 is set for performing subtractions. The number value 202, inserted into the key board 1, is, therefore, written in column 2, set up in the calculating drives, and, after starting the drive, subtractively transferred into the counting mechanism 21, so that the difference twenty three, indicating the consumption of electricity, appears in this counting mechanism. After the number 202 has been transferred into the counting mechanism, the paper platen carriage is again moved into the next column by means of the tabulator, i. e. into the column 3. In this column the key board 3 is coupled with the key board 1, the counting mechanism 21 is set for performing subtractions and the counting mechanism 23 is set for performing additions. The difference twenty three is read off from the counting mechanism 21 and inserted into the key board 1, so that the difference twenty three is written in column 3, introduced into the calculating drives, and, after starting the drive, transferred subtractively into the counting mechanism 21 and additively into the counting mechanism 23. If, therefore, the difference twenty three has been correctly read off, written and set, the counting mechanism 21 is set to zero. A wrong reading off or setting of the difference twenty three from the counting mechanism 21 becomes at once evident in this manner. Simultaneously the difference twenty three has been transferred into the counting mechanism 23 in which the values of consumption of all the bills to be calculated are added, so that, at the end of the operation, the total consumption of electricity may be read off from this counting mechanism. In column 3 the repeating key is depressed before starting the drive, so that the number value set in the setting pins is not cancelled by the drive. By means of the tabulator, the paper platen carriage is again moved into the next column, i. e. the column 4, whereby the key board 5 is coupled with the key board 1 and the counting mechanism 21 is brought additively in engagement with the calculating drives. The price of the kilowatt-hour, amounting to marks 0.32, is now written in column 4 and, by way of the key board 5, inserted into the multiplication rulers. After starting the drive, all the multiplication rulers come to action, so that the consumption of electricity of twenty three kilowatt hours, still set in the calculating drives, is introduced three times into the tens denomination and two times into the unit denomination of the counting mechanism 21. The product marks 7.36 then results. After the calculation is finished, the paper platen carriage is moved into the next column, i. e. the column 5. The key board 3 is coupled by the carriage with the key board 1 and the counting mechanism 21 is subtractively brought into engagement with the calculating drives, while the counting mechanism 22 is additively brought into engagement with the calculating drives. The product 7.36, taken from the counting mechanism 21 is inserted into this column and simultaneously set in the calculating drives. By starting the drive, the product is transferred from the counting mechanism 21 into the counting mechanism 22 which, however, is effected correctly only if the product has correctly been written and inserted in the calculating drives. In this also the correctness of the reading of the result can be checked. After the product has been transferred from one counting mechanism to another, the tabulator key is again depressed and the paper platen carriage is moved into the column 6 and couples the key board 3 with the key board 1 and additively engages the counting mechanism 22 with the calculating drives. In column 6, the meter charge, i. e. mark 0.80, is written and this value is simultaneously introduced into the calculating drives. By starting the drive, this number value is additively transferred into the counting mechanism 22, so that the sum, marks 8.16, appears. In the last column, that is in the column 7, the key board 3 is again coupled with the key board 1, the counting mechanism 22 is subtractively engaged with the calculating drives, whereas the counting mechanism 24 additively engages with the calculating drives. The sum 8.16 is written in the last column and inserted into the calculating drives. Transfer of the sum from the counting mechanism 22 to the counting mechanism 24 is then effected by the drive. Here also a check is provided which indicates whether the sum has been correctly copied and inserted, as, in case of a mistake, some value other than zero is indicated in the counting mechanism 22. In the counting mechanism 24 the final sums of all bills computed are added, so that the total amount of all bills may be read off from the counting mechanism 24.

I claim:

1. In a calculating machine, in combination, a plurality of controllable mechanisms, keyboards for operating the same and including a control key board, couplings between the control key board and the other key board or boards, and means associated with the control key board and operative selectively to couple one or more of the other key boards thereto to effect simultaneous operation thereof.

2. In a calculating machine, in combination, a writing machine, a key board therefor, a plurality of counting mechanisms having a common key board, a multiplier mechanism, a key board for the latter, coupling devices between the key board of the writing machine and the other key boards, and control mechanism for said coupling devices associated with said writing machine and operative to render effective the coupling devices between the key board of the writing machine and one or more of the other key boards selectively.

3. A calculating machine as claimed in claim 1, said means associated with the control keyboard including a paper platen carriage, cam members operatively associated with said carriage, yokes swingably arranged at a fixed point of said calculating machine, counter cam members attached to said yokes and adapted to be actuated by said first mentioned cam members, a contact piece fixed to said machine, a contact piece carried by each of said yokes, electromagnets associated with certain of said key boards, and electrical circuits connected to said contact pieces and to said electromagnets for coupling said key boards.

AUGUST KOTTMANN.